United States Patent [19]

Holley et al.

[11] Patent Number: 5,209,898
[45] Date of Patent: May 11, 1993

[54] FUEL ELEMENT OF A PRESSURIZED-WATER-NUCLEAR REACTOR AND FUEL ROD

[75] Inventors: Heinz-Peter Holley, Forchheim; Rolf Holzer, Erlangen; Guenther Lill, Herzogenaurach; Alfred Neufert, Langensendelbach; Wolfgang Schricker, Schwaig; Peter Suchy, Erlangen, all of Fed. Rep. of Germany

[73] Assignee: Siemens Aktiengesellschaft, Munich, Fed. Rep. of Germany

[21] Appl. No.: 448,926

[22] Filed: Dec. 12, 1989

[30] Foreign Application Priority Data

Dec. 12, 1988 [DE] Fed. Rep. of Germany ... 8815433[U]

[51] Int. Cl.$^5$ ............................................. G21C 3/34
[52] U.S. Cl. .................................. 376/438; 376/431; 376/444
[58] Field of Search ............... 376/444, 438, 439, 445, 376/416, 431, 900; 976/DIG. 59, DIG. 58

[56] References Cited

U.S. PATENT DOCUMENTS 4,057,466 11/1977 Thompson et al. ............ 376/217
4,749,547 6/1988 Blomstrand et al. ............. 376/444
5,094,805 3/1992 Suchy et al. ..................... 376/438

OTHER PUBLICATIONS

U.S. Publication "Vantage 5" American Power Conference Chicago, Illinois Apr. 22–24, 1985; article Vantage 5 PWR Fuel Assembly Demonstration Program at Vigil C. Summer Nuclear Station by Warner et al.
U.S. Publication "ANS Topical Meeting an LWR Fuel Performance" Williamsburg, VA Apr. 1987, article Recent Fuel Performance and Implementation of improved Products by Holzer et al.

Primary Examiner—Donald P. Walsh
Assistant Examiner—Neena Chelliah
Attorney, Agent, or Firm—Herbert L. Lerner; Laurence A. Greenberg

[57] ABSTRACT

A fuel assembly of a pressurized water nuclear reactor includes at least two fuel rods, respectively, having a cladding tube of given outer and inner diameters and pellets of given outer diameter received in the cladding tube, the fuel rods being disposed in the fuel assembly at a given mutual spacing of center points thereof, a ratio of the given mutual spacing of the center points of the fuel rods to the outer diameter of the cladding tube being in a range between 1.35 and 1.37.

11 Claims, 1 Drawing Sheet

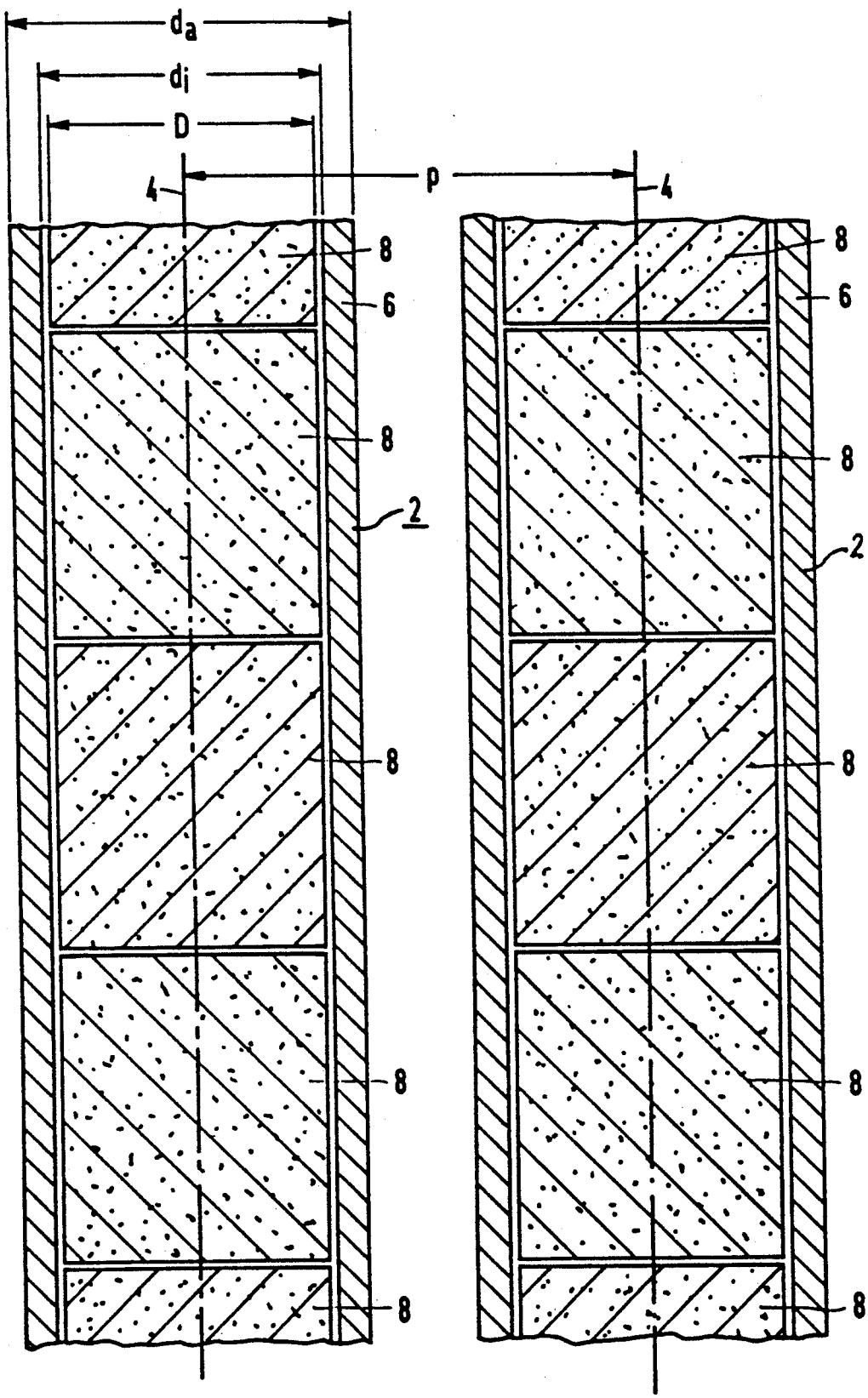

FUEL ELEMENT OF A PRESSURIZED-WATER-NUCLEAR REACTOR AND FUEL ROD

The invention relates to a fuel assembly of a pressurized water nuclear reactor, having at least two adjacent fuel rods, respectively, including a cladding tube of given outer and inner diameters and pellets of given outer diameter received in the cladding tube, the fuel rods being disposed in the fuel assembly at a given mutual spacing of center points thereof.

A fuel assembly and fuel rod of these general types have become known heretofore in various embodiments (R. Holzer, H. Knaab: Recent Fuel Performance Experience and Implementation of Improved Products, ANS-Topical Meeting on LWR Fuel Performance, Williamsburg, Va., U.S.A., Apr. 17 to 20, 1988; P. Schmiedel: Brennelemente fur Leichtwasserreaktoren: Stets auf Verbesserungssuche, "Energiewirtschaftliche Tagesfragen", 35th year (1985), Vol. 12, pp. 912–919). In accordance with these publications, a first fuel rod is provided with an outer diameter of 9.50 mm and an inner diameter of 8.22 mm and contains cylindrical tablets or pellets having a diameter $D=8.05$ mm; respective centers of the individual first fuel rods are disposed in a fuel assembly at a spaced distance $p=12.7$ mm from one another.

A second fuel rod of this type has an outer diameter $d_a=10.75$ mm, an inner diameter $d_i=9.30$ mm and a pellet diameter $D=9.11$ mm; the distance p from center to center of the individual second fuel rods in the fuel assembly is 14.3 mm. From these values it is apparent that the ratio $p/d_a$ in the state of the art lies in a range between 1.32 and 1.33. This ratio does not only apply to fuel rods of this general type which is commercially available from one particular manufacturer, but also for embodiments produced by other manufacturers.

In reactor technology, a goal has been set to improve fuel assemblies in various respects and, in fact, especially with respect to thermal hydraulics and neutron utilization. In the field of thermal hydraulics, a decrease in pressure loss and an improvement in CHF-Margins (Critical Heat Flux Margins) are sought after. In the field of neutron utilization, the goals are improvement in moderation ratio and decrease in neutron absorption by the structure material i.e. in particular the cladding tube material.

A special solution has become known heretofore in the state of the art (P. C. Warner, W. L. Orr; Vantage 5, PWR Fuel Assembly Demonstration Program, APC, Chicago, U.S.A., Apr. 22 to 24, 1985), wherein with respect to then conventional embodiments, the outer and inner diameters of the cladding tubes and, simultaneously, the pellet diameter D, were reduced. In this special solution, the values $d_a=9.14$ mm, $d_i=8.00$ mm and $D=7.84$ mm were selected. From these values, and by suitably selecting the spaced distance of the centers of the fuel rods a ratio $p/d_a=1.38$ to 1.41 is established. This ratio value thus lies above the aforementioned previous state-of-the-art value of 1.32 to 1.33.

A consequence of this particular solution is that the pressure loss can be reduced; however, the CHF-Margins are significantly impaired or worsened. The moderation is clearly improved by these measures, and the neutron absorption as well. A disadvantage of this special solution, however, is that, due to the reduction in the outer diameter D of the pellets, only a relatively limited fuel weight can be accommodated in the individual fuel rods. This, in turn, leads to the development of an increase in reload quantity or a decrease in cycle number ($=$ratio of the total number of fuel assemblies in the core with respect to the number of reloaded fuel assemblies per cycle), with resultant relatively poor fuel utilization. Furthermore, with this particular solution, higher specific manufacturing costs for the fuel elements i.e. manufacturing costs per kilogram of uranium oxide, arise. A further important disadvantage is that, with conventional fuel elements and fuel rods, conversion of the pellet manufacturing operation to other diameters is required. Finally, it is also to be noted that considerable specific costs for fuel disposal, expressed in monetary units per fuel assembly, can result.

It is accordingly an object of the invention to provide a fuel assembly with fuel rods of the aforementioned general type wherein an improvement in thermal hydraulics and neutron utilization is effected without having to change over to other pellet diameters in the manufacturing process. No reductions in fuel mass per fuel rod as well as the resulting disadvantages should occur, in comparison with conventional fuel rod design. Furthermore, the specific costs for fuel disposal should be relatively small.

With the foregoing and other objects in view, there is provided, in accordance with the invention, in a fuel assembly of a pressurized water nuclear reactor, at least two fuel rods, respectively, comprising a cladding tube of given outer and inner diameters and pellets of given outer diameter received in the cladding tube, the fuel rods being disposed in the fuel assembly at a given mutual spacing of center points thereof, a ratio of the given mutual spacing of the center points of the fuel rods to the outer diameter of the cladding tube being in a range between 1.35 and 1.37. In this case, the outer diameter D of the pellets remains the same as for conventional pellets, namely 8.05 mm or 9.11 mm. In contrast with the special solution noted hereinbefore, the diameter D of the individual pellets is maintained constant, and the inside diameter $d_i$ of the cladding tube is left unchanged, while merely its outer diameter $d_a$ is reduced.

In accordance with other features of the invention, the given outer diameters of the cladding tube are either 9.36 mm or 10.53 mm. Accordingly, the conventional outer diameters have been reduced from 9.50 to 9.36 mm and from 10.75 to 10.53 mm.

In accordance with further features of the invention, the mutual spacing of the center points p of adjacent fuel rods is 12.7 mm or 14.3 mm.

In accordance with an added feature of the invention, a standard inner diameter of 8.22 or 9.30 mm is selected for the fuel rods, the outer diameter D of the individual pellets remaining approximately the same as for conventional pellets, namely 8.05 mm or 9.11 mm. Pellets with these dimensions are thus readily available in commerce. Unconventional pellet dimensions should, of course, be avoided.

Other features which are considered as characteristic for the invention are set forth in the appended claims.

Although the invention is illustrated and described herein as embodied in a fuel element of a pressurized-water nuclear reactor and fuel rod thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing which is a fragmentary longitudinal sectional view of two adjacent fuel rods of a fuel assembly for a pressurized water nuclear reactor.

Referring now to the figure of the drawing, there is shown therein at the left-hand side of the figure a fuel rod 2, having a central axis 4 and including a cladding tube 6, for example of zircalloy, and a number of pellets or fuel tablets 8 formed of uranium or plutonium oxide. These pellets 8 have an outer diameter D corresponding to a conventional dimensioning of $D=8.05$ mm or $D=9.11$ mm. An inner diameter $d_i$ of the cladding tube 6 in this embodiment is $d_i=8.22$ mm or 9.30 mm, thus also conventional dimensions. It must be noted and emphasized that an outer diameter $d_a$ of the cladding tube 6 is smaller than that of the conventional state of the art. It is here selected, in the embodiment at hand, as $d_a=9.36$ mm or 10.53 mm.

A center point of the fuel rod 2 located at the left-hand side of the figure is spaced a distance p from a center point of fuel rod 2 disposed adjacent thereto at the right-hand side of the figure. This distance $p=12.7$ and 14.3 mm, respectively. These, also, are conventional values. From the aforementioned values a ratio $p/d_a$ is derived which is in the range of 1.35 to 1.37. Values of 1.357 and 1.358, respectively, result in the case at hand.

With the herein given values of p, $d_a$, $d_i$, D, advantageous characteristics with regard to thermal hydraulics and effective neutron utilization in the fuel assembly are produced. In particular, with respect to the aforementioned solution, (sufficient) improvement in the pressure loss and only a slight impairment or reduction in the CHF-Margins is experienced. Furthermore, a slight improvement in the moderation ratio as well as a clear decrease in the neutron absorption can be observed. It is noted that in fuel assemblies wherein a number of fuel rods 2 of the type shown are held mutually parallel in a structure for fixing the rods, the same fuel weight can be accommodated as for conventional solutions.

The foregoing is a description corresponding in substance to German Application G 88 15 433.5, dated Dec. 12, 1988, the International priority of which is being claimed for the instant application, and which is hereby made part of this application. Any material discrepancies between the foregoing specification and the aforementioned corresponding German application are to be resolved in favor of the latter.

We claim:

1. In a pressurized water nuclear reactor, a fuel assembly having at least two adjacent fuel rods, at least one of said fuel rods comprising a cladding tube of given outer and inner diameters and pellets of given outer diameter received in said cladding tube, the fuel rods being disposed in the fuel assembly at a given mutual spacing of center points thereof, a ratio of said given mutual spacing of said center points of the fuel rods to said outer diameter of said cladding tube being in a range between 1.35 and 1.37.

2. The fuel assembly according to claim 1, wherein said given outer diameter of said cladding tube is 9.36 mm.

3. The fuel assembly according to claim 1, wherein said mutual spacing of said center point of the fuel rods is 12.7 mm.

4. The fuel assembly according to claim 1, wherein said given inner diameter of said cladding tube is 8.22 mm.

5. In a pressurized-water nuclear reactor, a fuel rod comprising a cladding tube and pellets received in said cladding tube, said cladding tube having an outer diameter of 9.36 mm, and an inner diameter of 8.22 mm.

6. The fuel rod according to claim 5, wherein said outer diameter of said pellets is 8.05 mm.

7. The fuel assembly according to claim 1, wherein the given outer diameter of the cladding tube is 10.53 mm.

8. The fuel assembly according to claim 1, wherein the mutual spacing of the center point of the fuel rods is 14.3 mm.

9. The fuel assembly according to claim 1, wherein the fuel given inner diameter of the cladding tube is 9.30 mm.

10. In a pressurized-water nuclear reactor, a fuel rod comprising a cladding tube and pellets received in said cladding tube, the cladding tube having an outer diameter of 10.53 mm, and an inner diameter of 9.30 mm.

11. The fuel rod according to claim 10, wherein the outer diameter of the pellets is 9.11 mm.

* * * * *